United States Patent Office 2,934,633
Patented Apr. 26, 1960

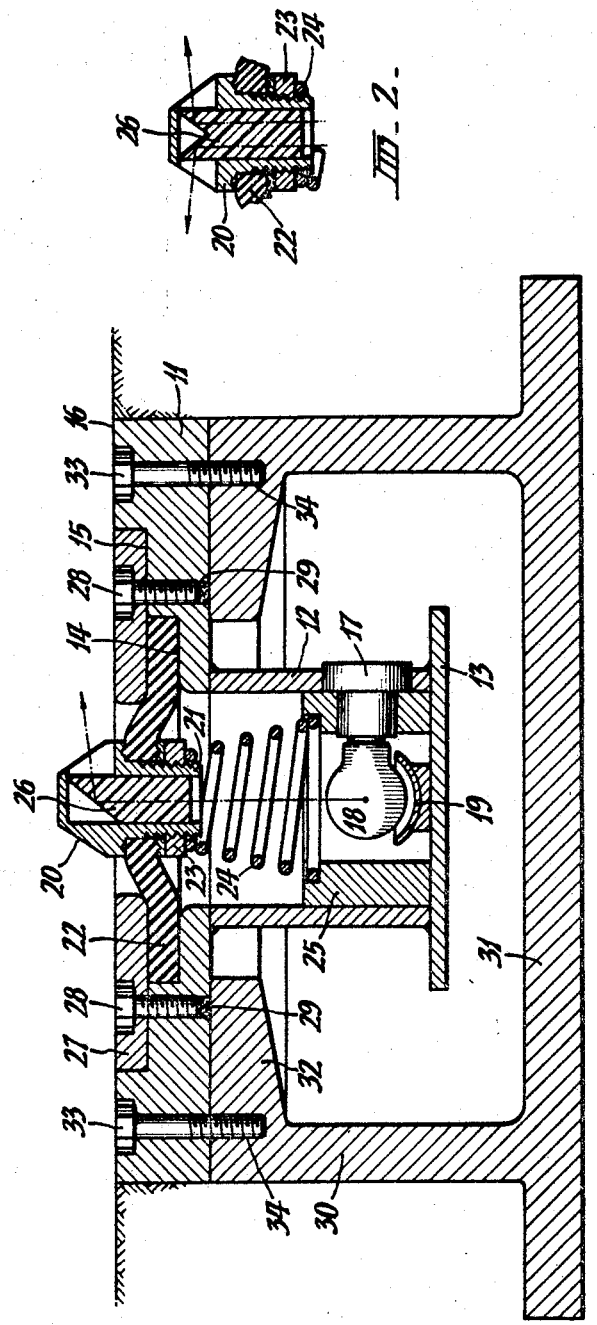

2,934,633

LIGHT FOR AIRCRAFT RUNWAYS AND THE LIKE

Ronald William Cumming, Brighton, Victoria, Australia, assignor to the Commonwealth of Australia, Crown Solicitor's Office, Canberra, Australia Application November 18, 1958, Serial No. 774,643

Claims priority, application Australia November 18, 1957

4 Claims. (Cl. 240—1.2)

This invention relates to a light for aircraft runways and the like.

There is a considerable demand for a device which can be placed in an aircraft runway or taxiway for providing visual guidance for pilots of aircraft, particularly at night, and which will not give any obstruction to the wheels, propellors or other parts of moving aircraft.

It is an object of this invention to provide a device which will meet this demand and with this object in view a device according to one aspect of this invention is characterised in that at least part thereof is supported by resilient means permitting movement on engagement by a wheel or other object.

More particularly a device according to the invention may comprise a source of illumination, light deflecting means, and means resiliently supporting said light deflecting means.

Other objects and features of the invention will be evident from the following description of a preferred form thereof.

In this description reference is made to the accompanying drawings wherein:

Figure 1 is a diametrical sectional view of a device according to the invention, and Figure 2 is a fragmentary diametrical sectional view showing an alternative form of prism for the device shown in Figure 1.

The device shown in Figure 1 comprises an annular plate 11 having a cylindrical body 12 welded to its lower side in a coaxial position. A circular plate 13 is welded to the bottom of the body 12. The welds are continuous so that the whole assembly provides a water-tight chamber. The plate 11 is flanged outwardly and upwardly so as to provide an annular platform 14 surrounding the central opening, a second annular platform 15 surrounding and higher than the platform 14 and a flange 16 surrounding and higher than the platform 15.

The body 12 is provided with a socket 17 for receiving a lamp 18 and also houses a reflector 19 mounted below the socket 17 and arranged so that when a lamp 18 is inserted and illuminated the beam shines upwardly from the reflector 19. Electrical connections (not shown) are provided leading to the lamp socket from the outside.

The device includes a frusto-conical deflector member 20 which has a coaxial stem 21 extending from its larger circular face and this member is supported above the lamp socket and reflector by a circular diaphragm 22. The diaphragm 22 is made of rubber reinforced with fabric plies or other suitable means and is of a suitable size to rest on the first annular platform 14. The deflector member 20 is attached to the diaphragm 22 by inserting its stem 21 through a central hole in the latter and engaging it by a nut 23 screwed on the stem 21 which is screw-threaded for this purpose. Alternatively, the deflector member may be attached to the diaphragm by bonding it in position or by any other suitable means. A spiral-helical compression spring 24 having its minimum diameter greater than the diameter of the stem of the deflector member 20 is disposed between the lower face of the nut 23 and an abutment ring 25 mounted in the body of the device, so as to urge the deflector member 20 upwardly.

The deflector member 20 may be entirely of optical material, or it may contain a prism 26 of glass, optical plastic or the like as shown arranged so that light passing upwardly from the reflector 19 in the body is deflected in the desired direction or directions.

The diaphragm 22 is held in position by a retaining plate 27 which is of annular shape and which is of a suitable size to fit the second platform 15. The retaining plate is connected to the annular plate 11 by bolts 28 which pass through countersunk holes in the retaining plate 27 and are screwed into appropriately screw-threaded holes 29 in the plate 11. The latter holes extend right through the plate 11 so that water cannot lodge in them.

The device described can be used without additional parts and sunk in the ground so that it is mainly supported by the annular plate 11 resting on the soil below it. It is preferred to transmit the load of the device to a lower stratum of the soil where there is less subsidence and with this in mind the device may be mounted on a base 30 which consists of a ring having the same outer diameter as the plate 11. The base 30 has an integral base plate 31 at its lower end and a radially inwardly directed flange 32 at its upper end. The plate 11 is attached to the base 30 by bolts 33 passing downwardly through the plate 31 and engaging in threaded bolt holes 34 in the base. The interior of the base 30 is of sufficient size to enclose the body 12 and its contents. The base 30 supports the plate 11 and its associated parts and transmits the weight to the soil at the level of the bottom of the base plate 31.

In use, the body is sunk into the ground so that the upper surface of the flange 16 of the plate 11 is flush with the ground surface. The thickness of the retaining plate 27 is such that it is then also flush with the surface when its bolts are tightened. The thickness of the diaphragm 22 is made greater than the vertical distance between the first and second annular platforms 14 and 15 so that when the bolts 28 are tightened the diaphragm is compressed between the plate 11 and the retaining plate 27 and a water-tight joint is obtained. Thus water is prevented from entering the body from above.

The inner edges of the plate 11 and the retaining plate 27 adjacent the diaphragm 22 are rounded off to avoid cutting the diaphragm and to allow it to move freely when necessary.

Normally the deflector member 20 is held upwardly by the spring 24 and the diaphragm is flexed convexly upwardly so that the frusto-conical part is above the ground surface. If the deflector member is struck by a rolling wheel the deflector member is pressed downwardly until it is flush with the ground surface and after the wheel has passed the member 20 springs up again. Where the wheel is not rotating, i.e. a skimming wheel, the deflector member 20 moves downwardly with a kind of rolling motion.

It is found that a light according to the invention can be provided to give beams visible from low angles of elevation, which is a very desirable feature, and very little obstruction to the passage of wheels and the like is discernible. The lights may therefore be used in centre positions such as an aiming light in a runway and centre lines of runways and taxiways, and bars of light extending outwardly from runways for roll guidance and other purposes.

The prism may be a uni-directional, bi-directional, multi-directional or omni-directional, and it will be evident that a deflector device may be readily replaced to provide a different type of prism whenever necessary.

The prism 26 shown in Figure 1 is uni-directional, being cut with a plant sloping surface to provide a beam with little divergence. In Figure 2 there is illustrated an omni-directional prism in which there is a conical hole drilled in the top of the prism so as to provide a conical reflective surface to give a light beam spread over a full circle. In each case the head of the device is apertured where necessary to allow passage of the light beam. Where the beam is omni-directional as in Figure 2 there may be ribs at intervals supporting the top of the deflecting device 20.

The claims defining the invention are as follows:

1. A light for aircraft runways and the like comprising a hollow water-tight body, a plate on said body having a central opening therein, a lamp socket fixedly supported in said body, a lamp inserted in said socket projecting light rays from within said body through the opening in said plate, a light deflecting member projecting through the opening in said plate and deflecting light rays from the lamp outside of the body and substantially parallel to the surface of the said plate, a diaphragm extending over the opening in said plate and having an opening therein to receive the light deflecting member, means attaching the light deflecting member to the diaphragm in water-tight sealing engagement therewith, means attaching the diaphragm to the plate in water-tight sealing engagement therewith, and means urging the light deflecting member outwardly from said body, said diaphragm being flexible whereby said light deflecting member may be depressed within the opening in the plate flush with said plate in opposition to the means urging the light deflecting member outwardly from said body.

2. A light for aircraft runways and the like comprising a hollow water-tight body, a plate on said body having a central opening therein, a lamp socket fixedly supported in said body, a lamp inserted in said socket projecting light rays from within said body through the opening in said plate, a light deflecting member projecting through the opening in said plate and deflecting light rays from the lamp outside the body and substantially parallel to the surface of the said plate, a diaphragm extending over the opening in said plate and having an opening therein to receive the light deflecting member, means attaching the light deflecting member to the diaphragm in water-tight sealing engagement therewith, means attaching the diaphragm to the plate in water-tight sealing engagement therewith, and a spring compressed between the light deflecting member and an abutment within the body, said diaphragm being flexible whereby said light deflecting member may be depressed within the opening in the plate flush with said plate in opposition to the action of said spring.

3. A light for aircraft runways and the like comprising a hollow water-tight body, a plate on said body having a central opening therein, a lamp socket fixedly supported in said body, a lamp inserted in said socket projecting light rays from within said body through the opening in said plate, a light deflecting member projecting through the opening in said body, said light deflecting member comprising a frusto-conical part having an integral screw-threaded stem extending coaxially from the larger circular face thereof and a prism of optical material disposed therein and deflecting light rays from the lamp outside the body and substantially parallel to the surface of the said plate, a diaphragm extending over the opening in said plate and having an opening therein to receive the stem of said light deflecting member, a nut engaged on the stem of said light deflecting member clamping the diaphragm in water-tight engagement between the frusto-conical part of the light deflecting member and the nut, means attaching the diaphragm to the plate in water-tight sealing engagement therewith, and a spring compressed between the nut and an abutment within the body, said diaphragm being flexible whereby said light deflecting member may be depressed within the opening in the plate flush with said plate in opposition to the action of said spring.

4. A light for aircraft runways and the like comprising a hollow water-tight body, a plate on said body having a central circular opening therein and an annular recess surrounding said opening, a lamp socket fixedly supported in said body, a lamp inserted in said socket projecting light rays from within said body through the opening in said plate, an annular retaining plate engaged in said annular recess, a circular diaphragm extending over the opening in said plate and held in said annular recess in water-tight engagement with said plate by said annular retaining plate, said diaphragm having a central circular aperture, a light deflecting member comprising a frusto-conical part with an integral screw-threaded stem projecting coaxially from the larger circular face thereof, said stem extending through the aperture in said diaphragm into the interior of said body, a nut engaged on the stem of said light deflecting member clamping the diaphragm to the light deflecting member in water-tight engagement, a spring compressed between the nut and an abutment in the body, a prism of optical material disposed in the light deflecting member and deflecting light rays from the lamp outside the body and substantially parallel to the surface of the said plate, said diaphragm being flexible whereby said light deflecting member may be depressed within the opening in the plate flush with said plate in opposition to the action of said spring.

References Cited in the file of this patent
UNITED STATES PATENTS

| 2,332,362 | Bartow | Oct. 19, 1943 |
| 2,719,214 | Potter | Sept. 27, 1955 |

FOREIGN PATENTS

| 523,454 | Canada | Apr. 3, 1956 |
| 759,847 | Great Britain | Oct. 24, 1956 |
| 759,848 | Great Britain | Oct. 24, 1956 |